United States Patent
Koteeswara et al.

(10) Patent No.: US 8,780,883 B2
(45) Date of Patent: Jul. 15, 2014

(54) SERVICE ROUTING METHOD AND SYSTEM ON SERVICE OVERLAY NETWORK

(71) Applicant: Huawei Technologies Co., Ltd., Shenzhen (CN)

(72) Inventors: Prabhu A. Koteeswara, Bangalore (IN); Heng Chang, Shenzhen (CN); Amogh Niranth, Bangalore (IN); Shan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 13/708,809

(22) Filed: Dec. 7, 2012

(65) Prior Publication Data

US 2013/0094504 A1    Apr. 18, 2013

Related U.S. Application Data

(63) Continuation of application No. PCT/CN2011/074936, filed on May 31, 2011.

(30) Foreign Application Priority Data

Jun. 9, 2010 (CN) .......................... 2010 1 0200655

(51) Int. Cl.
 *H04L 12/28* (2006.01)
 *H04L 12/56* (2006.01)
 *H04L 29/08* (2006.01)

(52) U.S. Cl.
 CPC .............. *H04L 45/64* (2013.01); *H04L 67/327* (2013.01)
 USPC ............................ 370/349; 370/392; 370/400

(58) Field of Classification Search
 USPC ................................................ 370/392, 400
 See application file for complete search history.

(56) References Cited

U.S. PATENT DOCUMENTS

| | | |
|---|---|---|
| 7,246,148 B1 | 7/2007 | Phillips et al. |
| 2004/0003111 A1 | 1/2004 | Maeda et al. |

(Continued)

FOREIGN PATENT DOCUMENTS

| | | |
|---|---|---|
| CN | 1691619 A | 11/2005 |
| CN | 101179501 A | 5/2008 |

(Continued)

OTHER PUBLICATIONS

Foreign Communication from a Counterpart Application, PCT Application PCT/CN2011/074936, International Search Report dated Sep. 8, 2011, 2 pages.

(Continued)

*Primary Examiner* — Sai-Ming Chan
(74) *Attorney, Agent, or Firm* — Conley Rose, P.C.; Grant Rodolph; Nicholas K. Beaulieu

(57) ABSTRACT

Embodiments of the present invention provide a service routing method that includes: a current service routing entity receiving a service request, and the current service routing entity selecting a second service routing entity; if the second service routing entity is not the current service routing entity itself, the current service routing entity forwards the service request to the second service routing entity, sets the second service routing entity as the current service routing entity, and performs the receiving and the selecting until the second service routing entity selected by the current service routing entity is the current service routing entity itself; and if the second service routing entity is the current service routing entity itself, setting the current service routing entity as a first most adjacent service routing entity that obtains service registration information of the service and sends the service request to a service provider.

20 Claims, 11 Drawing Sheets

(56) References Cited

U.S. PATENT DOCUMENTS

| | | | |
|---|---|---|---|
| 2005/0030921 A1* | 2/2005 | Yau | 370/329 |
| 2008/0075084 A1* | 3/2008 | Choi et al. | 370/392 |
| 2009/0262741 A1* | 10/2009 | Jungck et al. | 370/392 |
| 2011/0238840 A1 | 9/2011 | Shi et al. | |

FOREIGN PATENT DOCUMENTS

| | | |
|---|---|---|
| CN | 101409905 A | 4/2009 |
| CN | 101686173 A | 3/2010 |

OTHER PUBLICATIONS

Foreign Communication From a Counterpart Application, European Application No. 11791900.1, Extended European Search Report dated May 15, 2013, 8 pages.

Chakraborty, D., et al., "GSD: A Novel Group-Based Service Discovery Protocol for MANETS," XP010611835, 4th International Workshop on Mobile and Wireless Communications Network, Piscataway, NJ, Sep. 9-11, 2002, pp. 140-144.

Xiang, Z., et al., "Peer-to-Peer Based Multimedia Distribution Service," XP011109145, IEEE Transactions on Multimedia, vol. 6, No. 2, Piscataway, NJ, Apr. 1, 2004, pp. 343-355.

Foreign Communication From a Related Counterpart Application, PCT Application PCT/CN2011/074936, Written Opinion dated Sep. 8, 2011, 3 pages.

Heng, et al., "Self Organization of Service Routing," Draft Standard for a Next Generation Service Overlay Network, IEEE P1903, Jun. 7, 2010, 3 pages.

Foreign Communication From a Related Counterpart Application, Chinese Application No. 2010102006555, Chinese Search Report dated Dec. 11, 2012, 3 pages.

\* cited by examiner

SERVICE ROUTING METHOD AND SYSTEM ON SERVICE OVERLAY NETWORK

CROSS-REFERENCE TO RELATED APPLICATIONS

This application is a continuation of International Application No. PCT/CN2011/074936, filed on May 31, 2011, which claims priority to Chinese Patent Application No. 201010200655.5, filed on Jun. 9, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular to a service routing method and a system on a service overlay network.

BACKGROUND

As mobile communications technologies develop rapidly, future telecom services are bound to vary and present various characteristics and complexity. Data services will take the place of voice services as the mainstream telecom services. The service servers and third-party applications are numerous. Services frequently interact and associate with each other to form a mesh structure.

In the industry, in an answer to the development trend of the broadband telecom service, each major vendor is promoting its own concept of a service delivery platform. At present, a technology and a framework are in urgent need to standardize the interaction mechanism between services, make services efficiently interact, simplify the sectors of creating and executing services, and make service operation more convenient.

In the prior art, the process of basic service routing is generally as follows: A service routing entity that receives a service request sends a service request to a home service routing entity of a service, and then the home service routing entity forwards the service request to the service requester, thereby completing service routing.

During the implementation of the basic service routing process, the inventor finds the following: The service routing entity that receives the service request must clearly know the home service routing entity of the service provider before the service request is routed to the service provider. In a self-organized networking manner, however, the home service routing entity of the service may exit the service overlay network. As such, by using the existing service routing method, the service request of the service requester may fail to be correctly routed to the service provider, resulting in service routing failure.

SUMMARY

Embodiments of the present invention provide a service routing method and a system on a service overlay network, which solve the problem in the prior art where the service routing entity that receives a service request must clearly know the home service routing entity of the service provider and therefore cannot efficiently adapt to the dynamic characteristic of the service overlay network.

In order to achieve the foregoing object, the embodiments of the present invention adopt the following technical solutions.

A method for routing a service on a service overlay network including: step A: receiving, by a current service routing entity, a service request, and selecting, by the current service routing entity, according to the routing code of a home service routing entity of the service, from its own service routing table, a second service routing entity corresponding to a routing code that has a most adjacency relationship with the routing code; if the second service routing entity is not the current service routing entity itself, forwarding, by the current service routing entity, the service request to the second service routing entity, where the service request carries the routing code of the home service routing entity; setting the second service routing entity as the current service routing entity, and performing step A until the second service routing entity selected by the current service routing entity is the current service routing entity itself; and if the second service routing entity is the current service routing entity itself, setting the current service routing entity as a first most adjacent service routing entity, obtaining, by the first most adjacent service routing entity, service registration information of the service from its corresponding service registration entity, and sending, by the first most adjacent service routing entity, the service request to a service provider according to an endpoint address of the service provider in the service registration information.

A method for newly joining a service overlay network including: step C: receiving, by a current service routing entity, the routing code of a newly joined service routing entity, and selecting a next-hop service routing entity that has a most adjacency relationship with the routing code from its own service routing table; if the next-hop service routing entity is not the current service routing entity itself, sending, by the current service routing entity, a service routing table update message to the next-hop service routing entity, where the service routing table update message carries the routing code of the newly joined service routing entity; if the routing code of the newly joined service routing entity is more adjacent to the routing code of the current service routing entity than a routing code of at least one neighboring service routing entity in the service routing table of the current service routing entity, updating, by the current service routing entity, its own service routing table by adding the newly joined service routing entity; setting the next-hop service routing entity as the current service routing entity, and performing step C until the next-hop service routing entity selected by the current service routing entity is the current service routing entity itself; and if the next-hop service routing entity is the current service routing entity itself, setting the current service routing entity as the most adjacent service routing entity; sending, by the most adjacent service routing entity, its own service routing table to the newly joined service routing entity, and updating the service routing table of the most adjacent service routing entity by adding the newly joined service routing entity.

A method for exiting a service overlay network including: obtaining, by an exiting service routing entity, from its corresponding first service registration entity, all service registration information stored on the first service registration entity; selecting, by the exiting service routing entity, from a service routing table, a most adjacent service routing entity that has a most adjacency relationship in terms of routing codes with the exiting service routing entity, and sending a service routing entity exit request that carries the service registration information to the most adjacent service routing entity; registering, by the most adjacent service routing entity, the service registration information with its corresponding second service registration entity; deleting, by the most adjacent service routing entity, the exiting service routing entity from its own service routing table, and sending a service routing table update message to a neighboring service routing entity in the service routing table; and after the neighboring service routing entity receives the service routing table update message, if the service routing table of the neighboring service routing entity includes the exiting service routing entity, deleting the exiting service routing entity from the service routing table.

A service overlay network system including: a service routing entity configured to receive a service request, and select, according to the routing code of a home service routing entity of the service, from its own service routing table, a second service routing entity corresponding to a routing code that has a most adjacency relationship with the routing code, where if the second service routing entity is not the service routing entity itself, the service routing entity forwards the service request to the second service routing entity; a most adjacent service routing entity, where when the second service routing entity selected by the service routing entity is the service routing entity itself, configured to set the service routing entity as the most adjacent service routing entity; send a service registration information query request to a service registration entity; receive service registration information returned by the service registration entity; and send the service request to a service provider according to an endpoint address of the service provider in the service registration information; and the service registration entity configured to receive the service registration information query request sent by the most adjacent service routing entity; and send the service registration information to the most adjacent service routing entity.

A service overlay network system including: a service routing entity configured to receive the routing code of a newly joined service routing entity, and select a next-hop service routing entity that has a most adjacency relationship with the routing code from its own service routing table; where, if the next-hop service routing entity is not the service routing entity itself, the service routing entity sends a service routing table update message to the next-hop service routing entity, where the service routing table update message carries the routing code of the newly joined service routing entity; if the routing code of the newly joined service routing entity is more adjacent to the routing code of the service routing entity than the routing code of at least one neighboring service routing entity in the service routing table of the service routing entity, the service routing entity updates its own service routing table by adding the newly joined service routing entity; and a most adjacent service routing entity, where if the next-hop service routing entity selected by the service routing entity is the service routing entity itself, configured to set the service routing entity as the most adjacent service routing entity; send a service routing table to the newly joined service routing entity, and update its own service routing table of the most adjacent service routing entity by adding the newly joined service routing entity.

A service overlay network system including: an exiting service routing entity configured to send a service registration information request to its corresponding first service registration entity; receive all service registration information stored on the first service registration entity sent by the first service registration entity; where, the exiting service routing entity selects from its own service routing table, a most adjacent service routing entity that has a most adjacency relationship in terms of routing codes with it, and sends a service routing entity exit request that carries the service registration information to the most adjacent service routing entity; the first service registration entity configured to receive the service registration information request sent by the exiting service routing entity; and send all service registration information stored on the first service registration entity to the exiting service routing entity; a most adjacent service routing entity configured to receive the service routing entity exit request sent by the exiting service routing entity; register the service registration information with its corresponding second service registration entity; where the most adjacent service routing entity deletes the exiting service routing entity from its own service routing table, and sends a service routing table update message to a neighboring service routing entity in the service routing table; a second service registration entity configured to accept registration of the service registration information sent by the most adjacent service routing entity; and return a registration response to the most adjacent service routing entity; and the neighboring service routing entity configured to receive the service routing table update message sent by the most adjacent service routing entity; where if the service routing table of the neighboring service routing entity includes the exiting service routing entity, the neighboring service routing entity deletes the exiting service routing entity from its own service routing table.

According to the service routing method and system on the service relay network provided in the embodiments of the present invention, in the self-organized mode, the service overlay network has favorable scalability, and the service routing entity may dynamically join or exit the service overlay network according to the overall load of the network.

When the service routing entity joins the service overlay network, the current service routing entity selects, according to the routing code of a newly joined service routing entity, from its own service routing table, a next-hop service routing entity that has a most adjacency relationship with the routing code. If the next-hop service routing entity is not the current service routing entity itself, the current service routing entity forwards the routing code of the newly joined service routing entity to the next-hop service routing entity, and the next-hop service routing entity continues to search for a service routing entity that is most adjacent to the newly joined service routing entity in its own service routing table in a cyclic, repeated, and iterative manner until a next-hop service routing entity that has a most adjacency relationship with the routing code of the newly joined service routing entity selected by a certain service routing entity from its own service routing table is the certain service routing entity itself, in which case, the certain service routing entity is the most adjacent service routing entity. Then the most adjacent service routing entity and the newly joined service routing entity separately update and set their own service routing tables to implement dynamic addition of the service routing entity.

When a service routing entity exits a service overlay network, an exiting service routing entity entrusts all service registration information stored on its corresponding service registration entity to a most adjacent service routing entity that has a most adjacency relationship in terms of routing codes with the exiting service routing entity, and then the most adjacent service routing entity updates a service routing table, implementing dynamic exit of the service routing entity.

During service routing, a current service routing entity receives a service request and selects, according to a routing table of a home service routing entity of the service, from its own service routing table, a second service routing entity that has a most adjacency relationship with it. If the second service routing entity is not the current service routing entity itself, the service routing entity forwards the service request to the second service routing entity, and the second service routing entity continues to search for a service routing entity that is most adjacent to the routing code of the newly joined service routing entity in its own service routing table in a cyclic, repeated, and iterative manner until a second service routing entity that has a most adjacency relationship with the routing code of the home service routing entity selected by a certain service routing entity from its own service routing table is the certain service routing entity itself, in which case, the certain service routing entity is the most adjacent service routing entity. Then the most adjacent service routing entity obtains service registration information from its corresponding service registration entity and sends the service request to a service provider according to an endpoint address of the service provider in the service registration information.

As such, according to the service routing method and system provided in the embodiments, during the service routing process, a service routing entity that receives a service request does not need to clearly know a home service routing entity of a service provider and may perform self-organized routing based on an adjacency relationship of the routing code allocated for the service routing entity to implement routing of the service request on the service overlay network, thereby efficiently adapting to the dynamic characteristic of the service overlay network.

BRIEF DESCRIPTION OF THE DRAWINGS

To better illustrate the present invention or the technical solution of the prior art, the following briefly describes the drawings that need to be used in the description of the present invention or the prior art. It is understandable that the drawings provide merely several embodiments of the present invention. Those skilled in the art may further obtain other drawings according to these drawings without innovative work.

DETAILED DESCRIPTION

The following describes the technical solutions of the embodiments of the present invention clearly and completely with reference to the accompanying drawings in the embodiments of the present invention. Evidently, the described embodiments are only some exemplary embodiments of the present invention, rather than all embodiments of the present invention. All other embodiments, which can be derived by persons of ordinary skill in the art from the embodiments given herein without making any creative effort, shall fall within the scope of the present invention.

Figure 1:
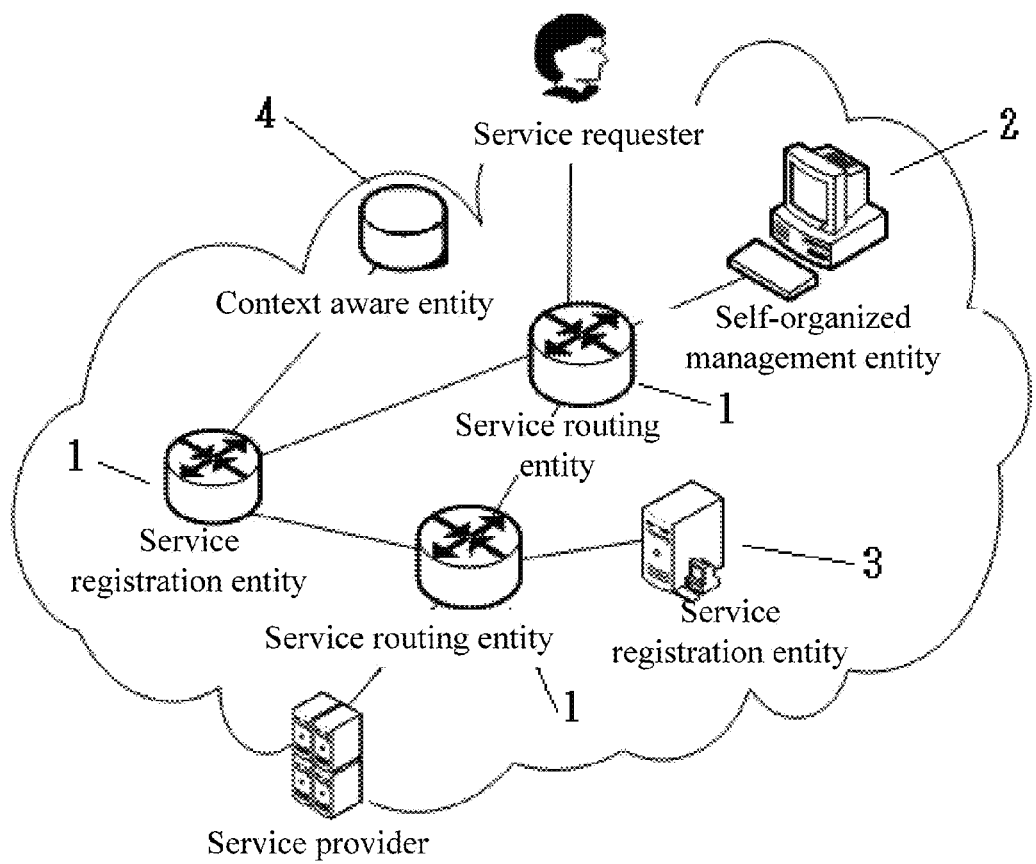
FIG. 1 is a schematic diagram of a system architecture of a service overlay network.

The system architecture of a service overlay network as shown in FIG. 1 includes the following major functional modules:

Service routing entity 1:

(1) As the most important functional entity on the service overlay network, it provides the routing capability for service interaction messages, participates in almost all service interactions, and is the key control point in a service interaction.

(2) An identity of the service routing entity is used to uniquely identify the service routing entity on the service overlay network.

(3) The routing code of the service routing entity is used to perform self-organized routing based on the adjacency relationship of the code. The routing code includes two parts: the first part is a service type code and the second part is a node code.

(4) The endpoint address of the service routing entity is used to establish a bottom-layer physical connection channel with other entities.

(5) The service routing entity maintains a service routing table, and the service routing table includes an adjacency table and a distance table. The adjacency table consists of information of several neighboring service routing entities that are adjacent to the service routing entity in terms of routing codes, including the service routing entity itself and its most adjacent service routing entity; the distance table consists of information of several remote service routing entities that are far in terms of routing codes. The service routing table stores the identities, routing codes, and endpoint addresses of these service routing entities.

(6) The service routing entity may be specified a service type so that the self-organized routing process may be accelerated, and optimization for specific service types may be performed.

Self-organized management entity 2:

(1) It provides the service overlay network with self-organized management and control capabilities. Its most important function is to allocate a routing code to a service routing entity and process addition of the service routing entity to the service overlay network. The routing code is an important basis for self-organized service routing.

(2) Based on context information, it selects a guidance service routing entity for guidance on addition.

(3) It stores information about a service routing entity on the service overlay network, such as an identity and the routing code of the network. For a guidance service routing entity, it further stores the endpoint address. It provides the information to the external for query.

Service registration entity 3:

(1) The service registration entity 3 stores registration information of a service, including an service address, an endpoint address, and certain dynamic information.

For the service address, during the registration process of the service, the service overlay network allocates a service address which is used to route a service request on the service overlay network. The form of the service address is Service_ID@SR_ID. Service_ID is the identity of the service, and SR_ID is an identity of the home service routing entity of the service. The home service routing entity is allocated by the service overlay network during the service registration process.

Context awareness 4:

(1) It is the entity for the source of various types of context information on the service overlay network.

Figure 2:
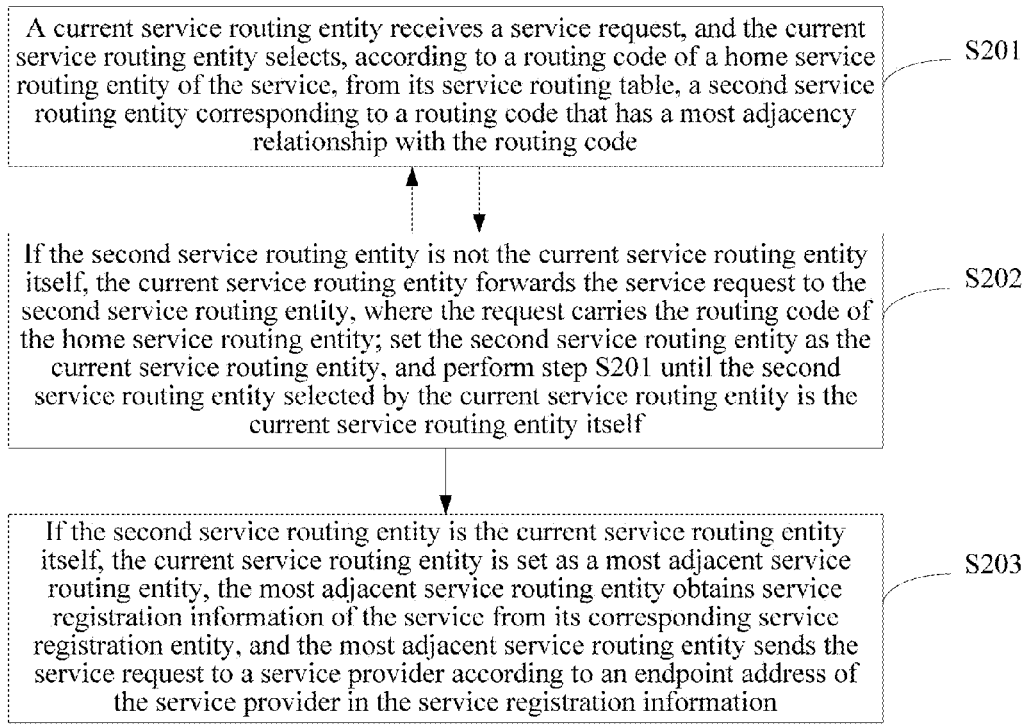
FIG. 2 is a block diagram of a process of a method for routing a service on a service overlay network according to an embodiment of the present invention.

An embodiment of the present invention provides a method for routing a service on a service overlay network, as shown in FIG. 2. The steps of the method include:

S201: A current service routing entity receives a service request, and the current service routing entity selects, according to the routing code of a home service routing entity of the service, from its own service routing table, a second service routing entity corresponding to a routing code that has a most adjacency relationship with the routing code.

S202: If the second service routing entity is not the current service routing entity itself, the current service routing entity forwards the service request to the second service routing entity, where the service request carries the routing code of the home service routing entity; set the second service routing entity as the current service routing entity, and perform step S201 until the second service routing entity selected by the current service routing entity is the current service routing entity itself.

S203: If the second service routing entity is the current service routing entity itself, set the current service routing entity as a most adjacent service routing entity. The most adjacent service routing entity obtains service registration information of the service from its corresponding service registration entity, and the most adjacent service routing entity sends the service request to a service provider according to an endpoint address of the service provider in the service registration information.

According to the service routing method provided in this embodiment, during service routing, a current service routing entity receives a service request, and selects, according to a routing table of a home service routing entity of the service, from its own service routing table, a second service routing entity that has a most adjacency relationship with the current service routing entity. If the second service routing entity is not the current service routing entity itself, the service routing entity forwards the service request to the second service routing entity, and the second service routing entity continues to search for a service routing entity that is most adjacent to the routing code of the newly joined service routing entity in its own service routing table in a cyclic, repeated, and iterative manner until a second service routing entity that has a most adjacency relationship with the routing code of the home service routing entity selected by a certain service routing entity from its own service routing table is the certain service routing entity itself, in which case, the certain service routing entity is the most adjacent service routing entity. Then the most adjacent service routing entity obtains service registration information from its corresponding service registration entity and sends the service request to a service provider according to an endpoint address of the service provider in the service registration information. As such, during the service routing process, a service routing entity that receives a service request does not need to clearly know a home service routing entity of a service provider and may perform self-organized routing based on an adjacency relationship of a routing code allocated for the service routing entity to implement routing of the service request on the service overlay network, thereby efficiently adapting to the dynamic characteristic of the service overlay network.

Figure 3:
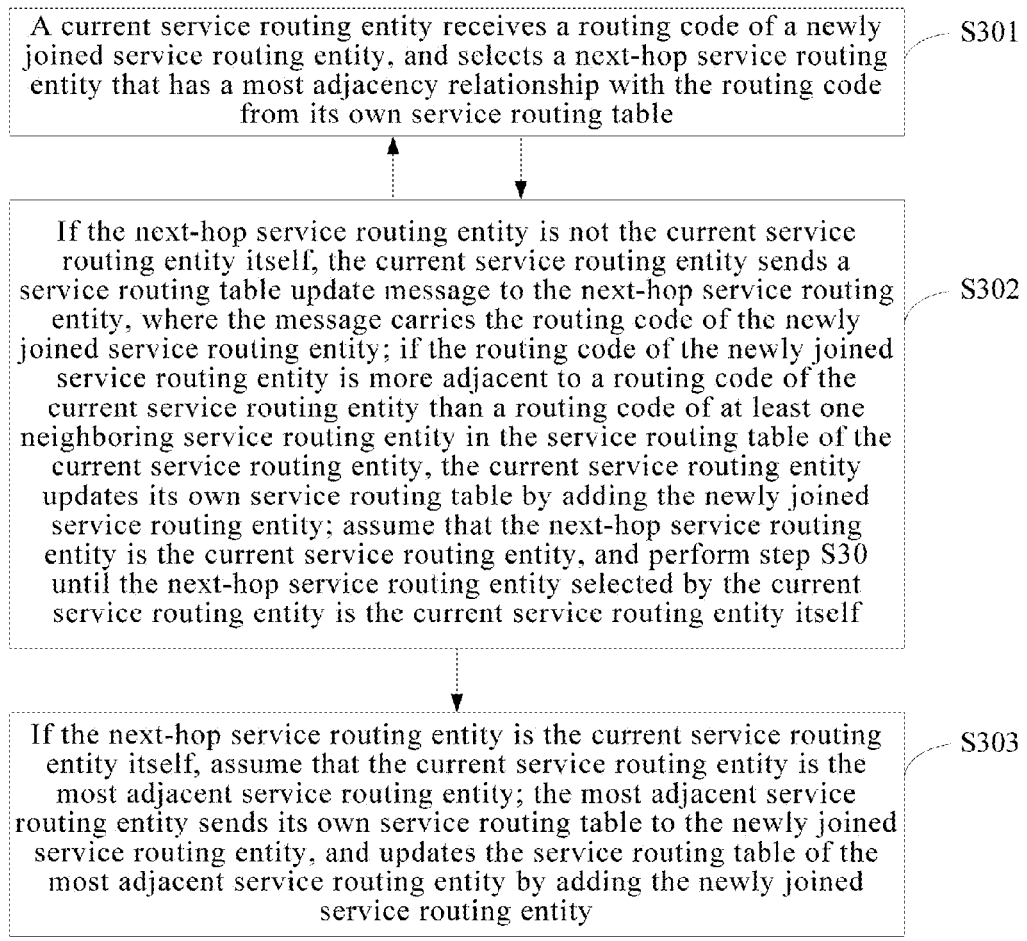
FIG. 3 is a block diagram of a process of a method for newly joining a service overlay network according to an embodiment of the present invention.

An embodiment of the present invention provides a method for newly joining a service overlay network, as shown in FIG. 3. The steps of the method include:

S301: A current service routing entity receives the routing code of a newly joined service routing entity and selects a next-hop service routing entity that has a most adjacency relationship with the routing code from its own service routing table.

Here, if the routing code of the newly joined service routing entity received by the current service routing entity is a routing code that is allocated by a self-organized management entity for the newly joined service routing entity where the allocated routing code is obtained from the self-organized management entity by receiving an addition guidance request of the newly joined service routing entity, the current service routing entity is the guidance service routing entity; the newly joined service routing entity joins the service overlay network for the first time.

Alternatively, if receiving, by the current service routing entity, the routing code of the newly joined service routing entity is obtaining the routing code of the newly joined service routing entity from an addition guidance request by receiving an addition guidance request of the newly joined service routing entity, the current service routing entity is also the guidance service routing entity; at this time, the newly joined service routing entity joins the service overlay network not for the first time.

S302: If the next-hop service routing entity is not the current service routing entity itself, the current service routing entity sends a service routing table update message to the next-hop service routing entity, where the service routing table update message carries the routing code of the newly joined service routing entity; if the routing code of the newly joined service routing entity is more adjacent to the routing code of the current service routing entity than a routing code of at least one neighboring service routing entity in the service routing table of the current service routing entity, the current service routing entity updates its own service routing table by adding the newly joined service routing entity; set the next-hop service routing entity as the current service routing entity, and perform step S301 until the next-hop service routing entity selected by the current service routing entity is the current service routing entity itself.

S303: If the next-hop service routing entity is the current service routing entity itself, it is assumed that the current service routing entity is the most adjacent service routing entity; the most adjacent service routing entity sends its own service routing table to the newly joined service routing entity, and updates the service routing table of the most adjacent service routing entity by adding the newly joined service routing entity.

According to the method for newly joining a service overlay network provided in this embodiment, a current service routing entity selects, according to the routing code of a newly joined service routing entity, from its own service routing table, a next-hop service routing entity that has a most adjacency relationship with the routing code. If the next-hop service routing entity is not the current service routing entity itself, the current service routing entity forwards the routing code of the newly joined service routing entity to the next-hop service routing entity, and the next-hop service routing entity continues to search for a service routing entity that is most adjacent to the newly joined service routing entity in its own service routing table in a cyclic, repeated, and iterative manner until a next-hop service routing entity that has a most adjacency relationship with the routing code of the newly joined service routing entity selected a certain service routing entity from its own service routing table is the current service routing entity itself, in which case, the service routing entity is the most adjacent service routing entity. Then the most adjacent service routing entity and the newly joined service routing entity separately update and set their own service routing tables to implement dynamic addition of the service routing entity. For such dynamic addition, during the service routing process, self-organized routing may be performed based on an adjacency relationship of a routing code, and a service routing entity that receives a service request does not need to clearly know a home service routing entity of a service provider, thereby efficiently adapting to the dynamic characteristic of the service overlay network.

Figure 4:
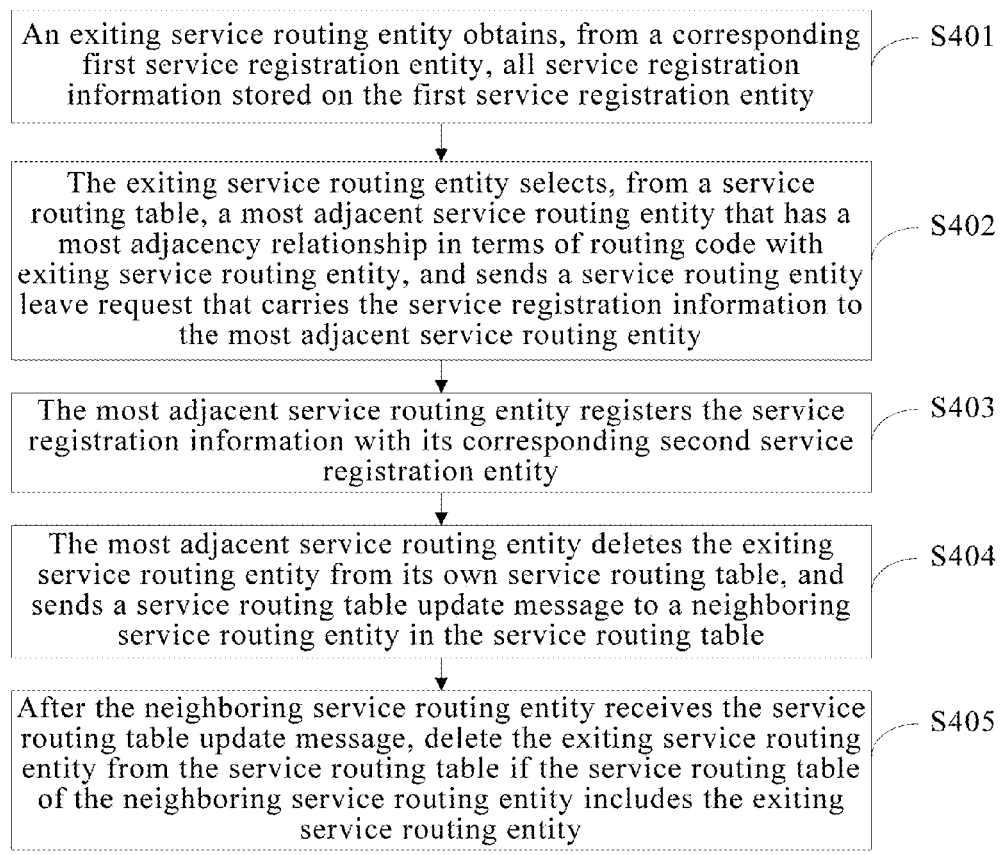
FIG. 4 is a block diagram of a process of a method for exiting a service overlay network according to an embodiment of the present invention.

An embodiment of the present invention provides a method for exiting a service overlay network, as shown in FIG. 4. The steps of the method include:

S401: An exiting service routing entity obtains, from its corresponding first service registration entity, all service registration information stored on the first service registration entity.

S402: The exiting service routing entity selects, from a service routing table, a most adjacent service routing entity that has a most adjacency relationship in terms of routing codes with the exiting service routing entity, and sends a service routing entity exit request that carries the service registration information to the most adjacent service routing entity.

S403: The most adjacent service routing entity registers the service registration information with its corresponding second service registration entity.

S404: The most adjacent service routing entity deletes the exiting service routing entity from its own service routing table and sends a service routing table update message to a neighboring service routing entity in the service routing table.

S405: After the neighboring service routing entity receives the service routing table update message, delete the exiting service routing entity from the service routing table if the service routing table of the neighboring service routing entity includes the exiting service routing entity.

According to the method for exiting the service overlay network provided in this embodiment, when a service routing entity exits the service overlay network, an exiting service routing entity entrusts all service registration information stored on its corresponding service registration entity to a most adjacent service routing entity that has a most adjacency relationship in terms of routing codes with the exiting service routing entity, and then the most adjacent service routing entity updates a service routing table, implementing dynamic exit of the service routing entity. For such dynamic exit, during the service routing process, self-organized routing may be performed based on an adjacency relationship of a routing code, and a service routing entity that receives a service request does not need to clearly know a home service routing entity of a service provider, thereby efficiently adapting to the dynamic characteristic of the service overlay network.

According to the method for routing a service on the service overlay network provided in this embodiment, assume that the service overlay network currently has five service routing entities. The specific information about these service routing entities is shown in Table 1. For the service type, the service type code for web application is 604122, the service type code for video is 538572, and the service type code for Web service is 678942. In this embodiment, because the number of service routing entities is small, the service routing table includes only the adjacency table. The adjacency relationship of routing codes is based on the precedence and successor relationship of the circular chain permutation formed by the routing codes. The adjacency table has three service routing entities, including the service routing entity itself, and the precedence service routing entity and successor service routing entity of the service routing entity.

TABLE 1

| | | Routing entity information | | |
|---|---|---|---|---|
| Identity | Endpoint Address | Service type | Routing Code | Service Routing Table |
| shenzhenSR | shenzhenSR.abc.com | Web application | 604122354256723491 | nanjingSR, shenzhenSR, shanghaiSR |
| nanjingSR | nanjingSR.abc.com | Video | 538572389347492947 | guangzhouSR, nanjingSR, shenzhenSR |
| shanghaiSR | shanghaiSR.abc.com | Web application | 604122738381735233 | shenzhenSR, shanghaiSR, beijingSR |
| beijingSR | beijingSR.abc.com | Web service | 678942354256723491 | shanghaiSR, beijingSR, guangzhouSR |
| guangzhouSR | guangzhouSR.abc.com | Web service | 678942677128361745 | beijingSR, guangzhouSR, nanjingSR |

Figure 5:
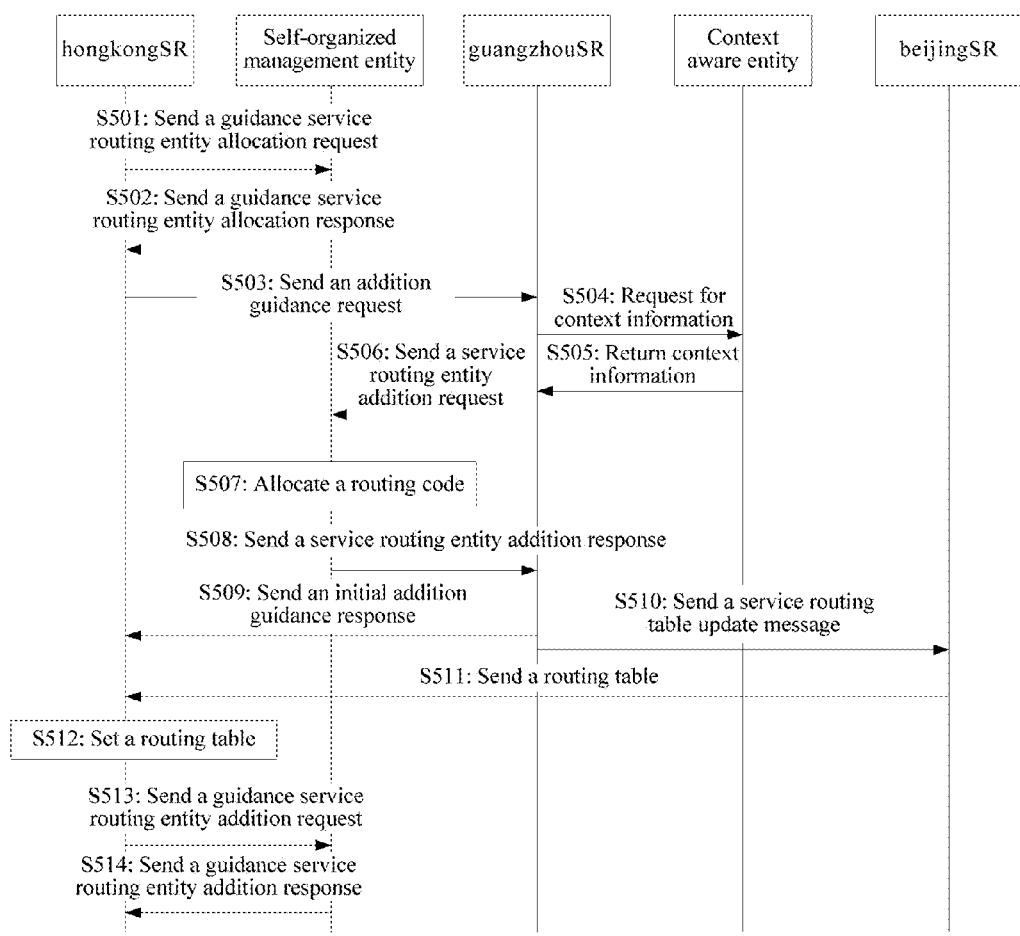
FIG. 5 is a schematic flowchart of a method for newly joining a service overlay network according to an embodiment of the present invention.

Service Routing Entity Addition Process:

As shown in FIG. 5, hongkongSR is a newly joined service routing entity that requests joining the service overlay network. The specific steps are as follows:

S501: hongkongSR is a service routing entity that newly joins the service overlay network, hongkongSR is the identity of the service routing entity, its endpoint address is hongkongSR.abc.com, and its service type is Web service. hongkongSR sends a guidance service routing entity allocation request to a self-organized management entity.

S502: The current list of guidance service routing entities is {shanghaiSR(shanghaiSR.abc.com), guangzhouSR(guangzhouSR.abc.com)}, where the processing load of guangzhouSR is lower than shanghaiSR. Therefore, the self-organized management entity selects guangzhouSR as the guidance service routing entity of hongkongSR. The self-organized management entity sends a guidance service routing entity allocation response to notify hongkongSR of the endpoint address guangzhouSR.abc.com of the selected guidance service routing entity guangzhouSR.

S503: According to the endpoint address guangzhouSR.abc.com of guangzhouSR, hongkongSR sends an addition guidance request to guangzhouSR, where the request carries its identity hongkongSR, and the endpoint address hongkongSR.abc.com, and specifies the service type of hongkongSR as Web service.

S504: guangzhouSR executes related guidance operations and sends a context request to a context awareness to request for the performance of the connection between hongkongSR and other service routing entities.

S505: The context awareness returns requested context information to guangzhouSR. For example: the network round trip time from hongkongSR to shenzhenSR, nanjingSR, shanghaiSR, beijingSR, and guangzhouSR take 1 milliseconds (ms), 3 ms, 5 ms, 2 ms, and 3 ms.

S506: guangzhouSR sends a service routing entity addition request to the self-organized management entity, where the request carries the identity of hongkongSR and the network round-trip time, and where the request specifies that the service type of hongkongSR is Web service.

S507: The self-organized management entity allocates a routing code for hongkongSR. The service type of hongkongSR is Web service, and the service type code for Web service is 678942. Service routing entities the service type of which is Web service on the service overlay network are beijingSR and guangzhouSR, where the network round-trip time between beijingSR and hongkongSR is less, that is, 2 ms. The node code of beijingSR is 354256723491. Then the self-organized management entity allocates a node code for hongkongSR, for example, 454256723491, which is adjacent to the node code and is not allocated, and the routing code of hongkongSR is then 678942454256723491. The self-organized management entity stores information such as the identity and routing code of hongkongSR.

It should be noted that in this embodiment, the service type of the newly joined service routing entity hongkongSR is specified. If the service type of the newly joined service routing entity hongkongSR is not specified, the self-organized management entity selects a second service routing entity that meets a required requirement (e.g., shortest network round-trip time) with the newly joined service routing entity on the service overlay network. If the service type of the second service routing entity is B, the service type code in the routing code of the second service routing entity is cb, and the node code is c1, then the self-organized management entity allocates cb as the service type code for the newly joined service routing entity and allocates a node code c2 that is adjacent to c1 and is not allocated. In this case, the service type code in the routing code of the newly joined service routing entity is cb, and the node code is c2.

S508: The self-organized management entity sends a service routing entity addition response to guangzhouSR, where the service routing entity addition response carries the routing code 678942454256723491 allocated for hongkongSR.

S509: guangzhouSR sends a first-time addition guidance response to hongkongSR, indicating that hongkongSR successfully joins the service overlay network. The first-time addition guidance response carries the routing code 678942454256723491 allocated for hongkongSR.

It should be noted that in this embodiment, the newly joined service routing entity hongkongSR joins the service overlay network for the first time. If the newly joined service routing entity joins the service overlay network after exiting the network, it is not first-time addition, and the newly joined service routing entity has a routing code. In step S503, the routing code is sent to the guidance service routing entity. Because the guidance service routing entity obtains the routing code of the newly joined service routing entity, it no longer needs to request the context awareness for the context information and request the self-organized management entity for the routing code. Therefore, S510 is directly performed after step S503 is performed.

S510: The service routing table of guangzhouSR is {beijingSR, guangzhouSR, nanjingSR}, where the routing code of beijingSR is 678942354256723491, which is most adjacent to the routing code 678942454256723491 of hongkongSR. Therefore, guangzhouSR selects beijingSR as the next-hop service routing entity and sends a service routing table update message to beijingSR, instructing hongkongSR to join the service overlay network with the identity hongkongSR, routing code 678942454256723491, and endpoint address hongkongSR.abc.com of the hongkongSR.

For guangzhouSR, the routing code 678942454256723491 of hongkongSR is more adjacent to the routing code 678942677128361745 of guangzhouSR than the routing code 678942354256723491 of beijingSR. As such, hongkongSR becomes the precedence service routing entity of guangzhouSR, and the service routing table of guangzhouSR is updated and becomes {hongkongSR, guangzhouSR, nanjingSR}.

S511: The service routing table of beijingSR is {shanghaiSR, beijingSR, guangzhouSR}, where the routing code 678942354256723491 of beijingSR is the most adjacent to the routing code 678942454256723491 of hongkongSR. As such, it may be determined that beijingSR is the most adjacent service routing entity of hongkongSR, beijingSR directly sends its own service routing table {shanghaiSR, beijingSR, guangzhouSR} to hongkongSR, and the service routing table update message is no longer forwarded. beijingSR performs service routing table update. The routing code 678942454256723491 of hongkongSR is more adjacent to the routing code 678942354256723491 of beijingSR than the routing code 678942677128361745 of guangzhouSR. As such, hongkongSR becomes the successor service routing entity of beijingSR, and the service routing table of beijingSR is updated and becomes {shanghaiSR, beijingSR, hongkongSR}.

S512: hongkongSR receives the service routing table {shanghaiSR, beijingSR, guangzhouSR} of beijingSR, determines that beijingSR is its precedence service routing entity and guangzhouSR is its successor service routing entity, and sets its service routing table to {beijingSR, hongkongSR, guangzhouSR}.

S513: hongkongSR is selected as the guidance service routing entity and sends a guidance service routing entity addition request to the self-organized management entity, where the request carries the endpoint address hongkongSR.abc.com of hongkongSR.

It should be noted here that, in this embodiment, the newly joined service routing entity hongkongSR joins the service overlay network for the first time. If the newly joined service routing entity does not join the network for the first time and is already a guidance service routing entity, the newly joined service routing entity sends a guidance service routing entity update request to the self-organized management entity, where the request carries the endpoint address of the newly joined service routing entity in the request.

S514: The self-organized management entity adds hongkongSR to the guidance service routing entity list. The guidance service routing entity list is updated and becomes {shanghaiSR (shanghaiSR.abc.com), guangzhouSR (guangzhouSR.abc.com), hongkongSR (hongkongSR.abc.com)}. The self-organized management entity sends a guidance service routing entity allocation response to hongkongSR.

Similarly, if the newly joined service routing entity does not join the network for the first time and is already a guidance service routing entity, the self-organized management entity updates the guidance service routing entity list after receiving the guidance service routing entity update request and sends a guidance service routing entity update success response to the newly joined service routing entity.

Figure 6:
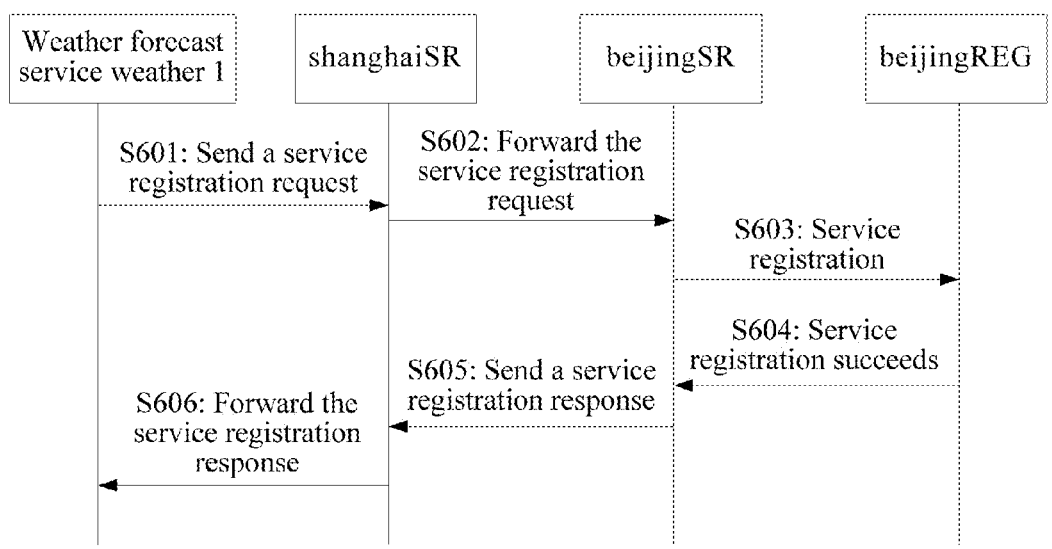
FIG. 6 is a schematic flowchart of a service registration process.

Service Registration Process:

As shown in FIG. 6, the specific steps include:

S601: The weather forecast service weather1 sends a service registration request to the access service routing entity shanghaiSR, where the service registration request carries related service registration information such as the service identity weather1, service type Web service, and endpoint address weather1.abc.com.

S602: The service routing table of shanghaiSR is {shenzhenSR, shanghaiSR, beijingSR}. shanghaiSR selects the service routing entity beijingSR the service type of which is also Web service from the table as the home service routing entity of weather1. shanghaiSR forwards the service registration request to beijingSR, where the service registration request carries related service registration information such as the service identity weather1, service type Web service, and endpoint address weather1.abc.com.

S603: beijingSR allocates a service address weather1 @beijingSR for weather1 and then registers the service address and related service registration information to its corresponding service registration entity beijingREG.

S604: beijingREG stores the service registration information and then notifies beijingSR of service registration success.

S605: beijingSR sends a service registration response to shanghaiSR, where the service registration response carries the service address weather1 @beijingSR allocated for the weather forecast service weather1.

S606: shanghaiSR forwards the service registration response to the weather forecast service weather1.

Figure 7:
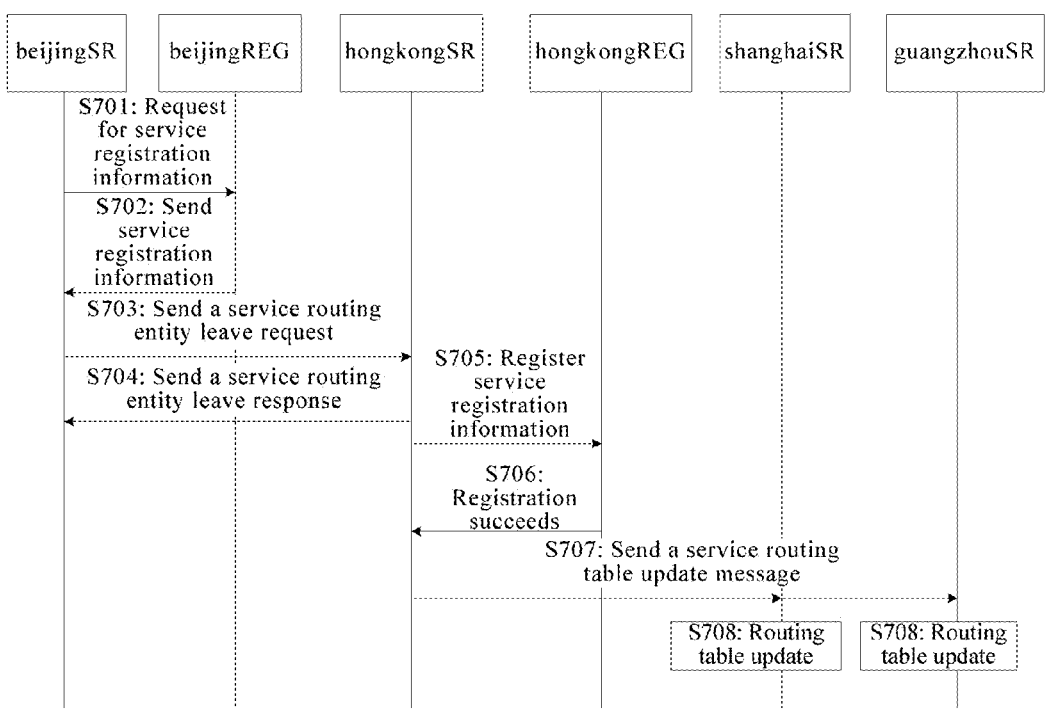
FIG. 7 is a schematic flowchart of a method for exiting a service overlay network according to an embodiment of the present invention.

Service Routing Entity Exiting Process:

As shown in FIG. 7, assume that beijingSR exits the service overlay network. The specific steps include:

S701: When beijingSR exits the service overlay network, it requests the corresponding service registration entity beijingREG for all service registration information stored on beijingREG, for example, including service registration information of the weather forecast service weather1: service identity weather1, service address weather1 @beijingSR, service type as Web service, and endpoint address weather1.abc.com.

S702: beijingREG sends the service registration information to beijingSR.

S703: The service routing table of beijingSR is {shanghaiSR, beijingSR, hongkongSR}, where the routing code 678942454256723491 of hongkongSR is the most adjacent to the routing code 678942354256723491 of beijingSR. Therefore, beijingSR sends a service routing entity exit request to hongkongSR, where the service routing entity exit request carries the service registration information, and further including the service routing table {shanghaiSR, beijingSR, hongkongSR} of beijingSR.

S704: hongkongSR takes over the service registration information and sends a service routing entity exit response to beijingSR. Then beijingSR exits the service overlay network.

S705: hongkongSR registers the service registration information, including service registration information of the weather forecast service weather1: service identity weather1, service address weather1 @beijingSR, service type as Web service, and endpoint address weather1.abc.com, to its corresponding service registration entity hongkongREG.

S706: hongkongREG stores the service registration information and then notifies hongkongSR of information registration success.

S707: hongkongSR deletes its precedence service routing entity beijingSR from its service routing table {beijingSR, hongkongSR, guangzhouSR}, and selects shanghaiSR from the service routing table {shanghaiSR, beijingSR, hongkongSR} of beijingSR as the new precedence service routing entity. Then the service routing table is updated and becomes {shanghaiSR, hongkongSR, guangzhouSR}. The service routing table update message that carries the service routing table {shanghaiSR, beijingSR, hongkongSR} of beijingSR is sent to the neighboring service routing entities shanghaiSR and guangzhouSR on its service routing table to indicate that beijingSR has already left the service overlay network.

S708: shanghaiSR deletes its successor service routing entity beijingSR from its service routing table {shenzhenSR, shanghaiSR, beijingSR}, and selects hongkongSR from the service routing table {shanghaiSR, beijingSR, hongkongSR} of beijingSR as the new successor service routing entity. Then the service routing table is updated and becomes {shenzhenSR, shanghaiSR, hongkongSR}. guangzhouSR receives the service routing table update message. Its service routing table {hongkongSR, guangzhouSR, nanjingSR} does not include beijingSR, and therefore does not need to be updated.

Figure 8:
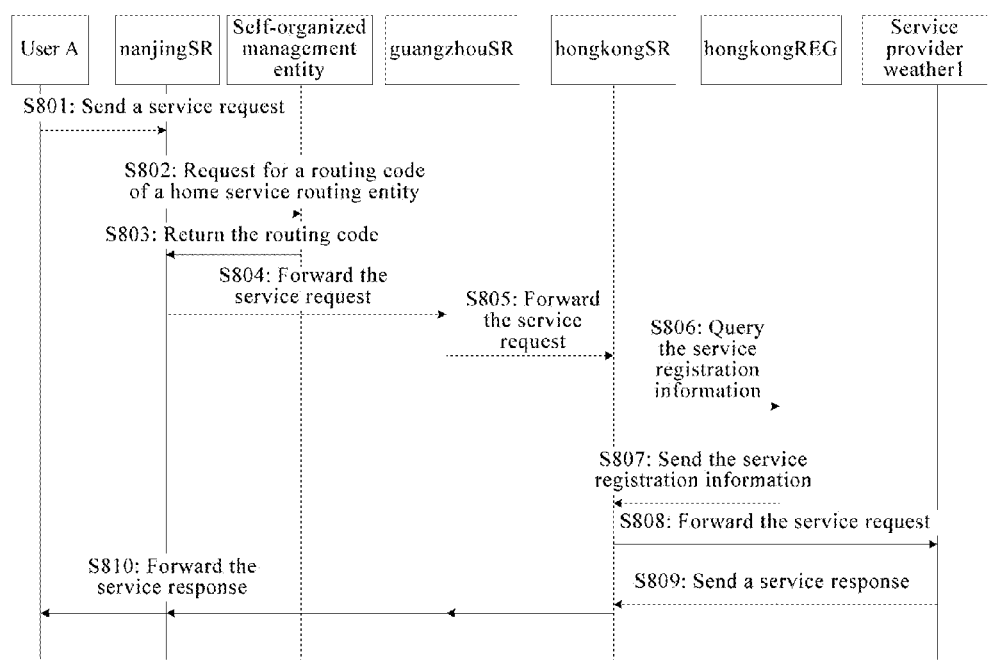
FIG. 8 is a schematic flowchart of a method for routing a service on a service overlay network according to an embodiment of the present invention.

Service Routing Process:

As shown in FIG. 8, the specific steps include:

S801: User A sends a weather forecast service request to the access service routing entity nanjingSR to query the weather condition in Beijing. The service request carries the service address weather1 @beijingSR of the weather forecast service weather1.

S802: nanjingSR obtains the home service routing entity of the service as beijingSR by parsing the service address weather1 @beijingSR, and requests the self-organized management entity for the routing code of beijingSR.

S803: The self-organized management entity queries the routing code of beijingSR as 678942354256723491, and returns the routing code 678942354256723491 to nanjingSR.

S804: The service routing table of nanjingSR is {guangzhouSR, nanjingSR, shenzhenSR}, where the routing code 678942677128361745 of guangzhouSR is the most adjacent to the routing code 678942354256723491 of beijingSR. Then nanjingSR selects guangzhouSR as the second service routing entity, and forwards the weather forecast service request to guangzhouSR, where the weather forecast service request carries the identity and routing code 678942354256723491 of beijingSR.

S805: The service routing table of guangzhouSR is {hongkongSR, guangzhouSR, nanjingSR}, where the routing code 678942454256723491 of hongkongSR is the most adjacent to the routing code 678942354256723491 of beijingSR. Then guangzhouSR selects hongkongSR as the second service routing entity and forwards the weather forecast service request to hongkongSR, where the weather forecast service request carries the identity and routing code 678942354256723491 of beijingSR.

S806: The service routing table of hongkongSR is {shanghaiSR, hongkongSR, guangzhouSR}, where its own routing code 678942454256723491 of hongkongSR is the most adjacent to the routing code 6789423542567234 91 of beijingSR. Then it may be determined that hongkongSR is the most adjacent service routing entity of beijingSR. Therefore, hongkongSR queries its corresponding service registration entity hongkongREG for the service registration information of service address weather1 @beijingSR.

S807: hongkongREG sends the following service registration information of service address weather1 @beijingSR to hongkongSR: service identity weather1, service address weather1 @beijingSR, service type as Web service, endpoint address weather1.abc.com, and so on.

S808: According to the endpoint address weather1.abc.com of the weather forecast service weather1, hongkongSR sends a weather forecast service request to the service provider weather1 to query the weather condition in Beijing.

S809: The service provider weather1 sends a service response that includes the weather condition in Beijing to hongkongSR.

S810: The service response is reversely forwarded along the routing path and finally sent to user A.

According to the service routing method on the service relay network provided in this embodiment, in the self-organized mode, the service overlay network has favorable scalability, and the service routing entity may dynamically join or exit the service overlay network according to the overall load of the network.

When the service routing entity joins the service overlay network, the current service routing entity selects, according to the routing code of a newly joined service routing entity, from its own service routing table, a next-hop service routing entity that has a most adjacency relationship with the routing code. If the next-hop service routing entity is not the current service routing entity itself, the current service routing entity forwards the routing code of the newly joined service routing entity to the next-hop service routing entity, and the next-hop service routing entity continues to search for a service routing entity that is most adjacent to the routing code of the newly joined service routing entity in its own service routing table in a cyclic, repeated, and iterative manner until a next-hop service routing entity that has a most adjacency relationship with the routing code of the newly joined service routing entity selected by a certain service routing entity from its own service routing table is the certain service routing entity itself, in which case, the certain service routing entity is the most adjacent service routing entity. Then the most adjacent service routing entity and the newly joined service routing entity separately update and set their own service routing tables to implement dynamic addition of the service routing entity.

When a service routing entity exits a service overlay network, an exiting service routing entity entrusts all service registration information stored on its corresponding service registration entity to a most adjacent service routing entity that has a most adjacency relationship in terms of routing codes with the exiting service routing entity, and then the most adjacent service routing entity updates a service routing table, implementing dynamic exit of the service routing entity.

During service routing, a current service routing entity receives a service request and selects, according to a routing table of a home service routing entity of the service, from its own service routing table, a second service routing entity that has a most adjacency relationship with it. If the second service routing entity is not the current service routing entity itself, the service routing entity forwards the service request to the second service routing entity, and the second service routing entity continues to search for a service routing entity that is most adjacent to the routing code of the newly joined service routing entity in its own service routing table in a cyclic, repeated, and iterative manner until a second service routing entity that has a most adjacency relationship with the routing code of the home service routing entity selected by a certain service routing entity from its own service routing table is the certain service routing entity itself, in which case, the certain service routing entity is the most adjacent service routing entity. Then the most adjacent service routing entity obtains service registration information from its corresponding service registration entity and sends the service request to a service provider according to an endpoint address of the service provider in the service registration information.

As such, according to the service routing method and system provided in the embodiments, during the service routing process, a service routing entity that receives a service request does not need to clearly know a home service routing entity of a service provider and may perform self-organized routing based on an adjacency relationship of a routing code allocated for the service routing entity to implement routing of the service request on the service overlay network, thereby efficiently adapting to the dynamic characteristic of the service overlay network.

In addition, by specifying a service type for a service routing entity, routing convergence during the self-organized routing process may be accelerated, reducing the routing hops.

Figure 9:
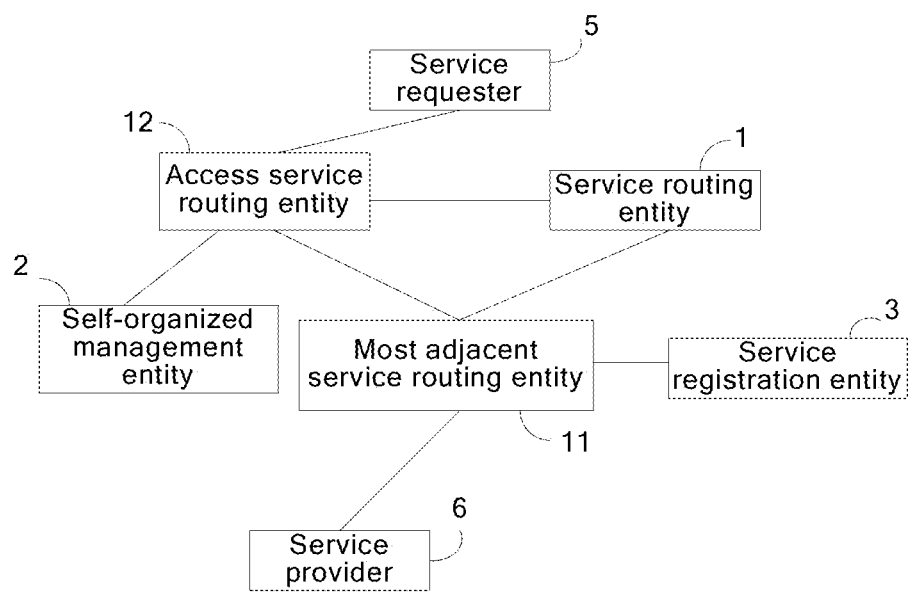
FIG. 9 is a first schematic diagram of an architecture of a service overlay network according to an embodiment of the present invention.

The service overlay network system provided in this embodiment, whose system architecture chart is shown in FIG. 9 includes: a service routing entity 1 configured to receive a service request and select, according to the routing code of a home service routing entity of the service, from its own service routing table, a second service routing entity corresponding to a routing code that has a most adjacency relationship with the routing code, where if the second service routing entity is not the service routing entity 1 itself, the service routing entity 1 forwards the service request to the second service routing entity; a most adjacent service routing entity 11, where when the second service routing entity selected by the service routing entity 1 is the service routing entity itself, the service routing entity 1 is set as the most adjacent service routing entity 11; configured to send a service registration information query request to a service registration entity 3; receive service registration information returned by the service registration entity 3; and send the service request to a service provider according to an endpoint address of the service provider in the service registration information; and the service registration entity 3 configured to receive the service registration information query request sent by the most adjacent service routing entity 11; and send the service registration information to the most adjacent service routing entity 11.

Further, the system provided in this embodiment further includes: a service requester 5 configured to send the service request to an access service routing entity 12; and receive a service response returned by the access service routing entity 12; the access service routing entity 12, where when receiving, by the service routing entity 1, the service request is receiving the service request from the service requester 5, the service routing entity 1 is set as the access service routing entity 12; configured to send a request that carries an identity of a home service routing entity to a self-organized management entity 2; receive the routing code of the home service routing entity returned by the self-organized management entity 2, where, the access service routing entity 12 selects, according to the routing code, a second service routing entity corresponding to a routing code that has a most adjacency relationship with the routing code from its own service routing table, and if the second service routing entity is not the access service routing entity 12 itself, the access service routing entity 12 forwards the service request to the second service routing entity; and forward the service response to the service requester 5; the self-organized management entity 2 configured to receive the request that carries the identity of the home service routing entity sent by the access service routing entity 12; query the routing code of the home service routing entity according to the identity of the home service routing entity; and send the routing code to the access service routing entity 12; and a service provider 6 configured to receive the service request forwarded by the most adjacent service routing entity 11; and send the service response to the most adjacent service routing entity 11.

According to the service overlay network system provided in this embodiment, during service routing, a current service routing entity receives a service request, and selects, according to a routing table of a home service routing entity of the service, from its own service routing table, a second service routing entity that has a most adjacency relationship with the current service routing entity. If the second service routing entity is not the current service routing entity itself, the service routing entity forwards the service request to the second service routing entity, and the second service routing entity continues to search for a service routing entity that is most adjacent to the routing code of the newly joined service routing entity in its own service routing table in a cyclic, repeated, and iterative manner until a second service routing entity that has a most adjacency relationship with the routing code of the home service routing entity selected by a certain service routing entity from its own service routing table is the certain service routing entity itself, in which case, the certain service routing entity is the most adjacent service routing entity. Then the most adjacent service routing entity obtains service registration information from its corresponding service registration entity and sends the service request to a service provider according to an endpoint address of the service provider in the service registration information. As such, during the service routing process, a service routing entity that receives a service request does not need to clearly know a home service routing entity of a service provider and may perform self-organized routing based on an adjacency relationship of a routing code allocated for the service routing entity to implement routing of the service request on the service overlay network, thereby efficiently adapting to the dynamic characteristic of the service overlay network.

Figure 10:
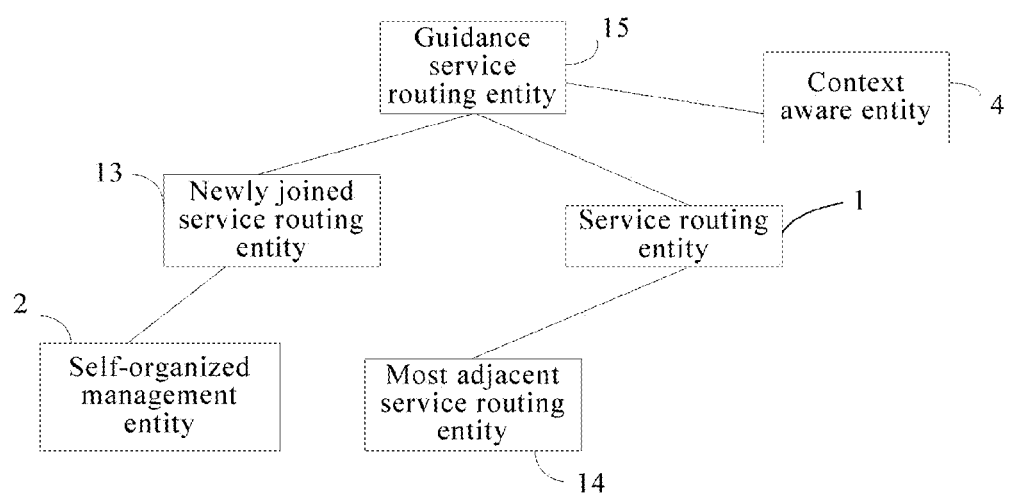
FIG. 10 is a second schematic diagram of an architecture of a service overlay network according to another embodiment of the present invention.

A service overlay network system provided in another embodiment of the present invention, as shown in FIG. 10, includes: a service routing entity 1 configured to receive the routing code of a newly joined service routing entity 13 and select a next-hop service routing entity that has a most adjacency relationship with the routing code from its own service routing table; where, if the next-hop service routing entity is not the service routing entity itself, the service routing entity 1 sends a service routing table update message to the next-hop service routing entity, where the service routing table update message carries the routing code of the newly joined service routing entity 13; if the routing code of the newly joined service routing entity 13 is more adjacent to the routing code of the service routing entity 1 than a routing code of at least one neighboring service routing entity in the service routing table of the service routing entity 1, the service routing entity 1 updates its own service routing table by adding the newly joined service routing entity 13; and a most adjacent service routing entity 14, where if the next-hop service routing entity selected by the service routing entity 1 is the service routing entity itself, the service routing entity 1 is set as the most adjacent service routing entity 14; configured to send a service routing table to the newly joined service routing entity 13, and update its own service routing table of the most adjacent service routing entity 14 by adding the newly joined service routing entity 13.

Further, the system provided in this embodiment further includes: the newly joined service routing entity 13 configured to send a guidance service routing entity allocation request to a self-organized management entity 2; receive a guidance service routing entity allocation response sent by the self-organized management entity 2; and send an addition guidance request to a guidance service routing entity 15; the self-organized management entity 2 configured to receive the guidance service routing entity allocation request sent by the newly joined service routing entity 13; allocate a guidance service routing entity for the newly joined service routing entity 13; send the guidance service routing entity allocation response to the newly joined service routing entity 13 to notify the newly joined service routing entity 13 of an endpoint address of the guidance service routing entity 15; allocate a routing code for the newly joined service routing entity 13; and send a service routing entity addition response to the guidance service routing entity 15; the guidance service routing entity 15, where when receiving, by the service routing entity 1, the routing code of the newly joined service routing entity 13 is acquiring the routing code allocated by the self-organized management entity 2 for the newly joined service routing entity 13 from the self-organized management entity 2 by receiving an addition guidance request of the newly joined service routing entity 13, the service routing entity 1 is set as the guidance service routing entity 15; configured to receive the addition guidance request sent by the newly joined service routing entity 13; send a context request to a context awareness 4; receive context information sent by the context awareness 4; send a service routing entity addition request to the self-organized management entity 2; receive a service routing entity addition response that carries the routing code of the newly joined service routing entity 13 sent by the self-organized management entity 2; where, the guidance service routing entity 15 selects a next-hop service routing entity that has a most adjacency relationship with the routing code from its own service routing table; if the next-hop service routing entity is not the guidance service routing entity 15 itself, the guidance service routing entity 15 sends a service routing table update message to the next-hop service routing entity, where the service routing table update message carries the routing code of the newly joined service routing entity 13; if the routing code of the newly joined service routing entity 13 is more adjacent to the routing code of the guidance service routing entity 15 than the routing code of at least one neighboring service routing entity in the service routing table of the guidance service routing entity 15, the guidance service routing entity 15 updates its own service routing table by adding the newly joined service routing entity 13; and the context awareness 4 configured to receive the context request sent by the guidance service routing entity 15; and return the context response to the guidance service routing entity 15 to notify the guidance service routing entity 15 of the context information of the service overlay network.

According to the service overlay network system provided in this embodiment, a current service routing entity selects, according to the routing code of a newly joined service routing entity, from its own service routing table, a next-hop service routing entity that has a most adjacency relationship with the routing code. If the next-hop service routing entity is not the current service routing entity itself, the current service routing entity forwards the routing code of the newly joined service routing entity to the next-hop service routing entity, and the next-hop service routing entity continues to search for a service routing entity that is most adjacent to the newly joined service routing entity in its own service routing table in a cyclic, repeated, and iterative manner until a next-hop service routing entity that has a most adjacency relationship with the routing code of the newly joined service routing entity selected by a certain service routing entity from its own service routing table is the certain service routing entity itself, in which case, the certain service routing entity is the most adjacent service routing entity. Then the most adjacent service routing entity and the newly joined service routing entity separately update and set their own service routing tables to implement dynamic addition of the service routing entity. For such dynamic addition, during the service routing process, self-organized routing may be performed based on an adjacency relationship of a routing code, and a service routing entity that receives a service request does not need to clearly know a home service routing entity of a service provider, thereby efficiently adapting to the dynamic characteristic of the service overlay network.

Figure 11:
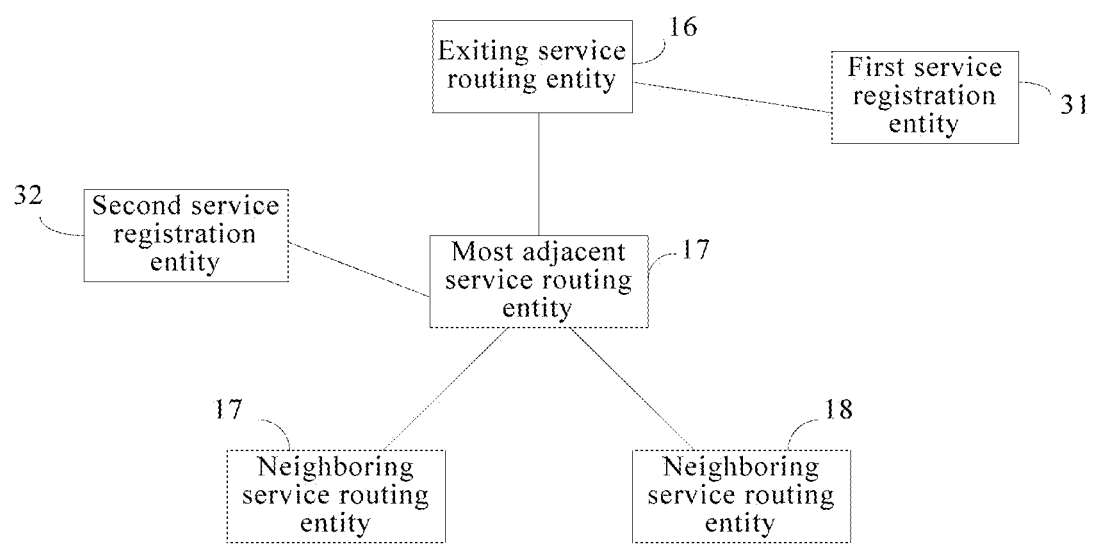
FIG. 11 is a third schematic diagram of an architecture of a service overlay network according to still another embodiment of the present invention.

A service overlay network system provided in still another embodiment of the present invention, as shown in FIG. 11, includes: an exiting service routing entity 16 configured to send a service registration information request to its corresponding first service registration entity 31; receive all service registration information stored on the first service registration entity sent by the first service registration entity 31; and select from its own service routing table, a most adjacent service routing entity 17 that has a most adjacency relationship in terms of routing codes with the exiting service routing entity and send a service routing entity exit request that carries the service registration information to the most adjacent service routing entity 17; the first service registration entity 31 configured to receive the service registration information request sent by the exiting service routing entity 16; and send all service registration information stored on the first service registration entity 31 to the exiting service routing entity 16; a most adjacent service routing entity 17 configured to receive the service routing entity exit request sent by the exiting service routing entity 16; register the service registration information with its corresponding second service registration entity 32; delete the exiting service routing entity 16 from its own service routing table, and send a service routing table update message to a neighboring service routing entity 18 on the service routing table; a second service registration entity 32 configured to accept registration of the service registration information sent by the most adjacent service routing entity 17; and return a registration response to the most adjacent service routing entity 17; and the neighboring service routing entity 18 configured to receive the service routing table update message sent by the most adjacent service routing entity 17; where if the service routing table of the neighboring service routing entity 18 includes the exiting service routing entity 16, the neighboring service routing entity 18 deletes the exiting service routing entity 16 from its own service routing table.

According to the service overlay network system provided in this embodiment, when a service routing entity exits the service overlay network, an exiting service routing entity entrusts all service registration information stored on its corresponding service registration entity to a most adjacent service routing entity that has a most adjacency relationship in terms of routing codes with the exiting service routing entity, and then the most adjacent service routing entity updates a service routing table, implementing dynamic exit of the service routing entity. For such dynamic exit, during the service routing process, self-organized routing may be performed based on an adjacency relationship of a routing code, and a service routing entity that receives a service request does not need to clearly know a home service routing entity of a service provider, thereby efficiently adapting to the dynamic characteristic of the service overlay network.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as read-only memory (ROM), random-access memory (RAM), magnetic disk, or compact disc read-only memory (CD-ROM).

The foregoing descriptions are merely exemplary embodiments of the present invention, but not intended to limit the present invention. Any variation or replacement made by persons skilled in the art without departing from the technical scope of the present invention shall fall within the protection scope of the present invention. Therefore, the protection scope of the present invention is subject to the appended claims.

What is claimed is:

1. A method for routing a service on a service overlay network comprising:

step A: receiving, by a current service routing entity, a service request, and selecting, by the current service routing entity, according to the routing code of a home service routing entity of a service, from its own service routing table, a second service routing entity corresponding to a routing code that has a most adjacency relationship with the routing code;

if the second service routing entity is not the current service routing entity itself, forwarding, by the current service routing entity, the service request to the second service routing entity, wherein the service request carries the routing code of the home service routing entity, setting the second service routing entity as the current service routing entity, and performing step A until the second service routing entity selected by the current service routing entity is the current service routing entity itself; and if the second service routing entity is the current service routing entity itself, setting the current service routing entity as a first most adjacent service routing entity, and obtaining, by the first most adjacent service routing entity, service registration information of the service from service registration entity corresponding to the first most adjacent service routing entity, and wherein the first most adjacent service routing entity sends the service request to a service provider according to an endpoint address of the service provider in the service registration information.

2. The method according to claim 1, wherein the service request carries a service address, and the service address comprises an identity of the service and an identity of the home service routing entity.

3. The method according to claim 2, wherein if the receiving, by the current service routing entity, the service request comprises receiving the service request from a service requester, the current service routing entity is set as an access service routing entity, and wherein after receiving the service request, the access service routing entity obtains the identity of the home service routing entity by parsing the service address carried in the service request and sends the identity of the home service routing entity to a self-organized management entity to acquire the routing code of the home service routing entity from the self-organized management entity.

4. The method according to claim 1, wherein the routing code comprises a service type code and a node code.

5. The method according to claim 4, wherein in the step A, the current service routing entity selects, from its own service routing table, a service routing entity a service type code of which is the same as a service type code of the home service routing entity and a node code of which is most adjacent to a node code of the home service routing entity as the second service routing entity.

6. The method according to claim 1, wherein before receiving, by the current service routing entity, the service request, the method further comprises:
step B: receiving, by an intermediate service routing entity, the routing code of a newly joined service routing entity and selecting a next-hop service routing entity that has a most adjacency relationship with the routing code from its own service routing table;
if the next-hop service routing entity is not the intermediate service routing entity itself, sending, by the intermediate service routing entity, a service routing table update message to the next-hop service routing entity, wherein the service routing table update message carries the routing code of the newly joined service routing entity;
if the routing code of the newly joined service routing entity is more adjacent to a routing code of the intermediate service routing entity than a routing code of at least one neighboring service routing entity in the service routing table of the intermediate service routing entity, updating, by the intermediate service routing entity, its own service routing table by adding the newly joined service routing entity, setting the next-hop service routing entity as the intermediate service routing entity, and performing step B until the next-hop service routing entity selected by the intermediate service routing entity is the intermediate service routing entity itself; and
if the next-hop service routing entity is the intermediate service routing entity itself, setting the intermediate service routing entity as a second most adjacent service routing entity, sending, by the second most adjacent service routing entity, its own service routing table to the newly joined service routing entity, and updating the service routing table of the second most adjacent service routing entity by adding the newly joined service routing entity.

7. The method according to claim 1, wherein before receiving, by the current service routing entity, the service request, the method further comprises:
obtaining, by an exiting service routing entity, from its corresponding first service registration entity, all service registration information stored on the first service registration entity;
selecting, by the exiting service routing entity, from a service routing table, a third most adjacent service routing entity that has a most adjacency relationship in terms of routing codes with the exiting service routing entity and sending a service routing entity exit request that carries the service registration information to the third most adjacent service routing entity;
registering, by the third most adjacent service routing entity, the service registration information with its corresponding second service registration entity;
deleting, by the third most adjacent service routing entity, the exiting service routing entity from its own service routing table, and sending a service routing table update message to a neighboring service routing entity in the service routing table; and
after receiving, by the neighboring service routing entity, the service routing table update message, if a service routing table of the neighboring service routing entity comprises the exiting service routing entity, deleting the exiting service routing entity from the service routing table.

8. A method for newly joining a service overlay network comprising:
step C: receiving, by a current service routing entity, the routing code of a newly joined service routing entity and selecting a next-hop service routing entity that has a most adjacency relationship with the routing code from its own service routing table;
if the next-hop service routing entity is not the current service routing entity itself, sending, by the current service routing entity, a service routing table update message to the next-hop service routing entity, wherein the service routing table update message carries the routing code of the newly joined service routing entity;
if the routing code of the newly joined service routing entity is more adjacent to the routing code of the current service routing entity than a routing code of at least one neighboring service routing entity in the service routing table of the current service routing entity, updating, by the current service routing entity, its own service routing table by adding the newly joined service routing entity, setting the next-hop service routing entity as the current service routing entity, and performing step C until the next-hop service routing entity selected by the current service routing entity is the current service routing entity itself; and
if the next-hop service routing entity is the current service routing entity itself, setting the current service routing entity as the most adjacent service routing entity, sending, by the most adjacent service routing entity, its own service routing table to the newly joined service routing entity, and updating the service routing table of the most adjacent service routing entity by adding the newly joined service routing entity.

9. The method according to claim 8, wherein if receiving, by the current service routing entity, the routing code of the newly joined service routing entity is acquiring a routing code that is allocated by a self-organized management entity for the newly joined service routing entity from the self-organized management entity by receiving an addition guidance request of the newly joined service routing entity, the current service routing entity is the guidance service routing entity, and the newly joined service routing entity joins the service overlay network for the first time.

10. The method according to claim 9, wherein if receiving, by the current service routing entity, the routing code of the newly joined service routing entity comprises obtaining the routing code of the newly joined service routing entity from a guidance request by receiving the addition guidance request of the newly joined service routing entity, setting the current service routing entity as the guidance service routing entity, wherein the newly joined service routing entity joins the service overlay network not for the first time.

11. The method according to claim 9, wherein before receiving, by the guidance service routing entity, the addition guidance request sent by the newly joined service routing entity, the method further comprises:
   sending, by the newly joined service routing entity, a guidance service routing entity allocation request to the self-organized management entity; and
   after receiving the guidance service routing entity allocation request, allocating, by the self-organized management entity, a guidance service routing entity for the newly joined service routing entity and returning a guidance service routing entity allocation response to the newly joined service routing entity to notify the newly joined service routing entity of an endpoint address of the guidance service routing entity.

12. The method according to claim 9, wherein receiving, by the guidance service routing entity, the addition guidance request of the newly joined service routing entity and acquiring the routing code allocated by the self-organized management entity for the newly joined service routing entity from the self-organized management entity comprises:
   receiving, by the guidance service routing entity, the addition guidance request sent by the newly joined service routing entity;
   requesting, by the guidance service routing entity, a context awareness for context information;
   returning, by the context awareness, the context information requested by the guidance service routing entity;
   after receiving the context information sent by the context awareness, sending, by the guidance service routing entity, a service routing entity addition request to the self-organized management entity, wherein the service routing entity addition request carries the identity of the newly joined service routing entity and the context information or further comprising the service type of the newly joined service routing entity;
   allocating, by the self-organized management entity, a routing code for the newly joined service routing entity, wherein the routing code comprises a service type code and a node code; and
   sending, by the self-organized management entity, a service routing entity addition response to the guidance service routing entity, wherein the service routing entity addition response carries the routing code.

13. The method according to claim 12, wherein allocating, by the self-organized management entity, the routing code for the newly joined service routing entity comprises:
   if the service type of the newly joined service routing entity is specified, and its service type code is ca, among the service routing entities that have a same service type on the service overlay network, selecting, by the self-organized management entity, a second service routing entity that meets a regulated requirement with the newly joined service routing entity;
   if a node code in the routing code of the second service routing entity is c1, allocating a node code c2 that is adjacent to c1 and is not allocated for the newly joined service routing entity, the service type code in the routing code of the newly joined service routing entity is ca, and wherein the node code is c2;
   if no service routing entities that have a same service type exist on the service overlay network, allocating, by the self-organized management entity, a node code c at random, wherein the service type code in the routing code of the newly joined service routing entity is ca, and wherein the node code is c; and
   if the service type of the newly joined service routing entity is not specified, selecting, by the self-organized management entity, on the service relay network, a second service routing entity that meets a regulated requirement with the newly joined service routing entity; and
   if the service type of the second service routing entity is B, the service type code in the routing code of the second service routing entity is cb, and the node code is c1, the service type code allocated for the newly joined service routing entity is cb, allocating a node code c2 that is adjacent to the c1 and is not allocated, wherein the service type code in the routing code of the newly joined service routing entity is cb, and wherein the code node is c2.

14. The method according to claim 9, further comprising:
   after receiving the service routing table sent by the most adjacent service routing entity, setting, by the newly joined service routing entity, its own service routing table of the newly joined service routing entity;
   sending, by the newly joined service routing entity, a guidance service routing entity addition request to the self-organized management entity; and
   returning, by the self-organized management entity, a guidance service routing entity addition response to the newly joined service routing entity.

15. The method according to claim 10, further comprising:
   after receiving the service routing table sent by the most adjacent service routing entity, setting, by the newly joined service routing entity, its own service routing table of the newly joined service routing entity;
   sending, by the newly joined service routing entity, a guidance service routing entity allocation request to the self-organized management entity; and
   returning, by the self-organized management entity, a guidance service routing entity allocation response to the newly joined service routing entity.

16. A method for exiting a service overlay network comprising:
   obtaining, by an exiting service routing entity, from its corresponding first service registration entity, all service registration information stored on the first service registration entity;
   selecting, by the exiting service routing entity, from a service routing table, a most adjacent service routing entity that has a most adjacency relationship in terms of routing codes with the exiting service routing entity and sending a service routing entity exit request that carries the service registration information to the most adjacent service routing entity;
   registering, by the most adjacent service routing entity, the service registration information with its corresponding second service registration entity;
   deleting, by the most adjacent service routing entity, the exiting service routing entity from its own service routing table and sending a service routing table update message to a neighboring service routing entity in the service routing table; and after the neighboring service routing entity receives the service routing table update message, if a service routing table of the neighboring service routing entity comprises the exiting service routing entity, deleting the exiting service routing entity from the service routing table.

17. A service overlay network system comprising:

a service routing entity configured to receive a service request and select, according to the routing code of a home service routing entity of the service, from its own service routing table, a second service routing entity corresponding to a routing code that has a most adjacency relationship with the routing code, wherein if the second service routing entity is not the current service routing entity itself, the service routing entity forwards the service request to the second service routing entity;

a most adjacent service routing entity, wherein when the second service routing entity selected by the service routing entity is the service routing entity itself, configured to set the service routing entity as the most adjacent service routing entity, send a service registration information query request to a service registration entity, receive service registration information returned by the service registration entity, and send the service request to a service provider according to an endpoint address of the service provider in the service registration information; and the service registration entity configured to receive the service registration information query request sent by the most adjacent service routing entity and send the service registration information to the most adjacent service routing entity.

18. The service overlay network system according to claim 17, further comprising:

a service requester configured to send the service request to an access service routing entity and receive a service response returned by the access service routing entity;

the access service routing entity, wherein when receiving, by the service routing entity, the service request comprises receiving the service request from the service requester, the service routing entity is set as the access service routing entity and is configured to send a request that carries an identity of a home service routing entity to a self-organized management entity and receive the routing code of the home service routing entity returned by the self-organized management entity, wherein, the access service routing entity selects, according to the routing code, a second service routing entity corresponding to a routing code that has a most adjacency relationship with the routing code from its own service routing table, and if the second service routing entity is not the access service routing entity itself, the access service routing entity forwards the service request to the second service routing entity and forwards the service response to the service requester;

the self-organized management entity configured to receive the request that carries the identity of the home service routing entity sent by the access service routing entity, query the routing code of the home service routing entity according to the identity of the home service routing entity, and send the routing code to the access service routing entity; and a service provider configured to receive the service request forwarded by the most adjacent service routing entity and send the service response to the most adjacent service routing entity.

19. A service overlay network system comprising:

a service routing entity configured to receive the routing code of a newly joined service routing entity and select a next-hop service routing entity that has a most adjacency relationship with the routing code from its own service routing table, wherein, if the next-hop service routing entity is not the service routing entity itself, the service routing entity sends a service routing table update message to the next-hop service routing entity, wherein the service routing table update message carries the routing code of the newly joined service routing entity, wherein if the routing code of the newly joined service routing entity is more adjacent to the routing code of the service routing entity than a routing code of at least one neighboring service routing entity in the service routing table of the service routing entity, the service routing entity updates its own service routing table by adding the newly joined service routing entity; and a most adjacent service routing entity, wherein if the next-hop service routing entity selected by the service routing entity is the service routing entity itself, configured to set the service routing entity as the most adjacent service routing entity, send a service routing table to the newly joined service routing entity, and update its own service routing table of the most adjacent service routing entity by adding the newly joined service routing entity.

20. A service overlay network system comprising:

an exiting service routing entity configured to send a service registration information request to its corresponding first service registration entity and receive all service registration information stored on the first service registration entity sent by the first service registration entity, wherein, the exiting service routing entity selects from its own service routing table, a most adjacent service routing entity that has a most adjacency relationship in terms of routing codes with the exiting service routing entity and sends a service routing entity exit request that carries the service registration information to the most adjacent service routing entity;

the first service registration entity configured to receive the service registration information request sent by the exiting service routing entity and send all service registration information stored on the first service registration entity to the exiting service routing entity;

a most adjacent service routing entity configured to receive the service routing entity exit request sent by the exiting service routing entity and register the service registration information with its corresponding second service registration entity, wherein the most adjacent service routing entity deletes the exiting service routing entity from its own service routing table and sends a service routing table update message to a neighboring service routing entity in the service routing table;

a second service registration entity configured to accept registration of the service registration information sent by the most adjacent service routing entity and return a registration response to the most adjacent service routing entity; and the neighboring service routing entity configured to receive the service routing table update message sent by the most adjacent service routing entity, wherein if a service routing table of the neighboring service routing entity comprises the exiting service routing entity, the neighboring service routing entity deletes the exiting service routing entity from its own service routing table.

* * * * *